United States Patent
Feng et al.

(10) Patent No.: US 11,736,597 B2
(45) Date of Patent: Aug. 22, 2023

(54) DATA EXCHANGE METHOD, ELECTRONIC DEVICE, AND NON-TRANSITORY STORAGE MEDIUM

(71) Applicant: GUANGDONG OPPO MOBILE TELECOMMUNICATIONS CORP., LTD., Guangdong (CN)

(72) Inventors: Tao Feng, Guangdong (CN); Chunliang Zeng, Guangdong (CN); Zhigang Yu, Guangdong (CN); Taiyue Wu, Guangdong (CN); Zhaoxuan Zhai, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/148,395

(22) Filed: Dec. 29, 2022

(65) Prior Publication Data

US 2023/0171333 A1     Jun. 1, 2023

Related U.S. Application Data

(63) Continuation of application No. PCT/CN2021/110458, filed on Aug. 4, 2021.

(30) Foreign Application Priority Data

Aug. 31, 2020 (CN) .......................... 202010899080.4

(51) Int. Cl.
*H04L 69/329* (2022.01)
*H04L 51/06* (2022.01)

(52) U.S. Cl.
CPC ............ *H04L 69/329* (2013.01); *H04L 51/06* (2013.01)

(58) Field of Classification Search
CPC ............................. H04L 51/06; H04L 69/329
(Continued)

(56) References Cited

U.S. PATENT DOCUMENTS

| 7,069,309 | B1  | 6/2006 | Dodrill et al. |
| 7,941,606 | B1* | 5/2011 | Pullela .................. H04L 69/22 711/128 |

(Continued)

FOREIGN PATENT DOCUMENTS

| CN | 101192173 A | 6/2008 |
| CN | 101493924 A | 7/2009 |

(Continued)

OTHER PUBLICATIONS

WIPO, International Search Report and Written Opinion for International Application No. PCT/CN2021/110458, dated Nov. 3, 2021.

(Continued)

*Primary Examiner* — James E Springer
(74) *Attorney, Agent, or Firm* — Hodgson Russ LLP

(57) ABSTRACT

A data exchange method is applied to a first electronic device and includes receiving a first message sent by a second electronic device, wherein the first message carries a first identifier, the first identifier is configured to identify a first transaction to which the first message belongs, an active transaction indicates a transaction initiated by the first electronic device, and a passive transaction indicates a transaction initiated by the second electronic device; in a case where a set bit indicates that the first transaction is the active transaction, feeding a processing result about the first transaction in the first message back to an application layer; and in a case where the set bit indicates that the first transaction is the passive transaction, requesting the application layer to output the processing result about the first transaction based on the first message.

20 Claims, 4 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2004/0243684 A1* | 12/2004 | Ha | H04L 12/2818 709/208 |
| 2007/0226738 A1 | 9/2007 | Vedula | |
| 2010/0132024 A1 | 5/2010 | Ben-Natan et al. | |
| 2011/0173490 A1 | 7/2011 | Narayanaswamy et al. | |
| 2012/0311566 A1 | 12/2012 | Takaoka et al. | |
| 2014/0258226 A1 | 9/2014 | Noteboom | |
| 2014/0297852 A1* | 10/2014 | Shimizu | G06F 11/3006 709/224 |
| 2016/0110239 A1* | 4/2016 | Couture | G06F 11/0751 714/37 |
| 2016/0197803 A1 | 7/2016 | Talbot et al. | |
| 2019/0166194 A1 | 5/2019 | Garza et al. | |
| 2021/0399965 A1* | 12/2021 | Le Maigat | H04L 43/0829 |

FOREIGN PATENT DOCUMENTS

| | | |
|---|---|---|
| CN | 104243290 A | 12/2014 |
| CN | 104951306 A | 9/2015 |
| CN | 105812238 A | 7/2016 |
| CN | 106201826 A | 12/2016 |
| CN | 109284212 A | 1/2019 |
| CN | 110377401 A | 10/2019 |
| CN | 111970102 A | 11/2020 |
| CN | 111988217 A | 11/2020 |

OTHER PUBLICATIONS

CNIPA, First Office Action for CN Application No. 202010899080.4, dated Dec. 23, 2021.
CNIPA, Notification to Grant Patent Right for Invention for CN Application No. 202010899080.4, dated Jul. 4, 2022.

* cited by examiner

DATA EXCHANGE METHOD, ELECTRONIC DEVICE, AND NON-TRANSITORY STORAGE MEDIUM

CROSS REFERENCE TO RELATED APPLICATIONS

The present application is a continuation of International Patent Application No. PCT/CN2021/110458, filed on Aug. 4, 2021, which claims priority to Chinese Patent Application No. 202010899080.4, filed on Aug. 31, 2020, the entire disclosures of which are incorporated by reference herein.

TECHNICAL FIELD

The present disclosure relates to the field of Internet of Things, and in particular to a data exchange method, an electronic device, and a non-transitory storage medium.

BACKGROUND

In related art, when a terminal interacts with a server, a data process and a data exchange are completed in a question-and-answer manner, and only after a transaction ends, can a next transaction be initiated, thereby reducing an efficiency of the data exchange.

SUMMARY OF THE DISCLOSURE

The embodiments of the present disclosure provide a data exchange method, an electronic device, and a non-transitory storage medium.

A data exchange method is provided and includes receiving a first message sent by a second electronic device, wherein the first message carries a first identifier, the first identifier is configured to mark a first transaction to which the first message belongs, a set bit in the first identifier is configured to indicate whether the first transaction is an active transaction or a passive transaction; the active transaction indicates a transaction initiated by the first electronic device, and the passive transaction indicates a transaction initiated by the second electronic transaction; feeding a processing result about the first transaction in the first message back to an application layer, in a case where the set bit indicates that the first transaction is the active transaction; and requesting the application layer to output the processing result about the first transaction based on the first message, in a case where the set bit indicates that the first transaction is the passive transaction.

An electronic device is provided and includes a processor and a memory configured to store a computer program runnable on the processor; wherein when running the computer program, the processor is configured to perform operations of the data exchange method described above.

A non-transitory storage medium is provided and stores a computer program, wherein when the computer program is executed by a processor, operations of the data exchange method described above are performed.

DETAILED DESCRIPTION

Figure 1:
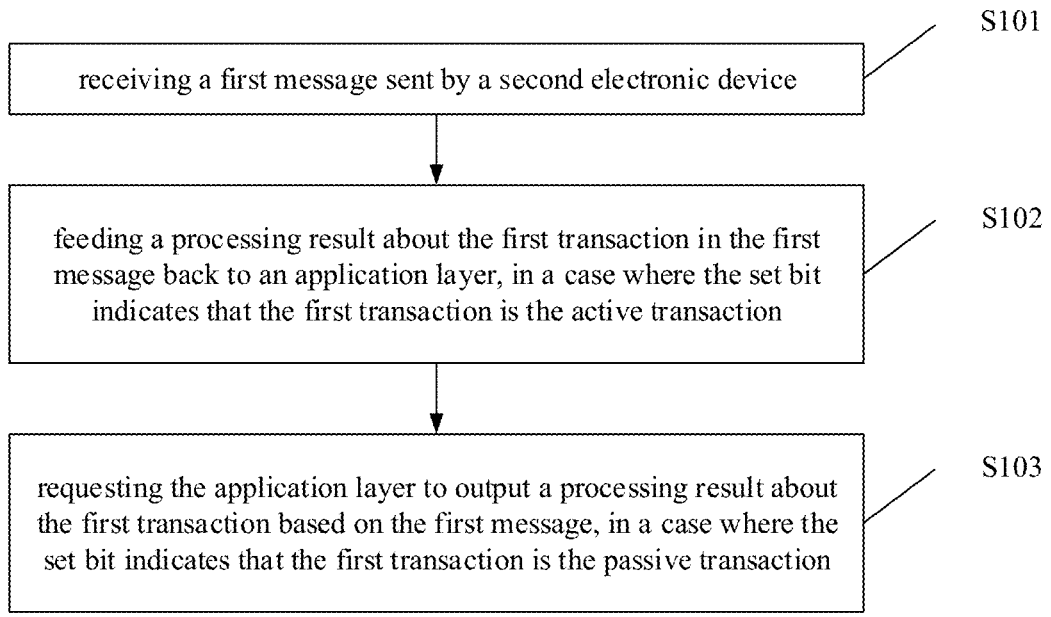
FIG. 1 is a schematic implementing flowchart of a data exchange method according to an embodiment of the present disclosure.

FIG. 1 is a schematic implementing flowchart of a data exchange method according to an embodiment of the present disclosure. As shown in FIG. 1, the method is applied to a first electronic device, and includes operations at blocks S101-S103.

At block S101, the method includes receiving a first message sent by a second electronic device. The first message carries a first identifier, the first identifier is configured to mark a first transaction to which the first message belongs, a set bit in the first identifier is configured to indicate whether the first transaction is an active transaction or a passive transaction. The active transaction indicates a transaction initiated by the first electronic device, and the passive transaction indicates a transaction initiated by the second electronic device.

Herein, the first electronic device receives the first message sent by the second electronic device. The first message carries the first identifier, and the first identifier is configured to mark the first transaction to which the first message belongs. In practical application, an electronic device may process different transactions simultaneously. That is, the electronic device processes at least two transactions simultaneously. The electronic device may distinguish the different transactions by means of the first identifier, such that the electronic device may process the different transactions orderly. The set bit in the first identifier is configured to indicate whether the first transaction is the active transaction or the passive transaction. The active transaction indicates the transaction initiated by the first electronic device, and the passive transaction indicates the transaction initiated by the second electronic transaction, such that transactions may be distinguished by initiators of the transactions. In an embodiment, a value of the set bit in the first identifier may be configured to determine whether the first transaction is the active transaction or the passive transaction. For example, a value of a set bit in a first identifier corresponding to a first transaction sent by the first electronic device is 1, for the first electronic device, the first transaction is the active transaction. A value of a set bit in a first identifier corresponding to a first transaction sent by the second electronic device is 0, for the first electronic device, the first transaction is the passive transaction. In the practical application, the first electronic device may actively initiate a transaction, such that the second electronic device processes the transaction initiated by the first electronic device. The first electronic device may also process the transaction initiated by the second electronic device, in which the first electronic device receives different messages, and the messages received by the first electronic device may be distinguished by means of first identifiers, facilitating subsequent processing. In the practical application, the first identifier includes a number of the first transaction which is configured to indicate the first transaction. The first identifier may also carry a mark indicating security of the message, i.e., a security mark. When it fails to detect that the first identifier carries the security mark in a process of receiving the message, corresponding data is refused to be performed with subsequent processing, and an access-forbidden error code is returned to the second electronic device. In a case where the security mark is detected in the first identifier, the first message is processed. In addition, the first identifier may include a bit indicating a start of the transaction. In a process of processing the first transaction, when a start identifier is not detected in the first identifier, an error code about the first transaction is returned to the second electronic device. In the practical application, when the first message received at any moment is a transaction-ending message, for example, the first message received by the first electronic device indicates to end the first transaction and delete the data associated with the first transaction, the first electronic device does not respond to or answer the first message. When the first message received by the first electronic device is an abnormal message other than the transaction-ending message or an alerting message, parameters for responding to a first message request are invalid, the first transaction is ended and the data associated with the first transaction is deleted, such that corresponding processing responses may be made according to different types of first messages.

At block S102, the method includes feeding a processing result about the first transaction in the first message back to an application layer, in a case where the set bit indicates that the first transaction is the active transaction.

Herein, in the case where the set bit indicates that the first transaction is the active transaction, it is indicated that the first message received by the first electronic device is obtained based on the transaction initiated by the first electronic device, and the first message is data configured to respond to the transaction initiated by the first electronic device. The processing result about the first transaction in the first message is fed back to the application layer based on the first message. In an embodiment, when the first electronic device initiates a transaction configured to acquire first data from the second electronic device, the first electronic device is able to receive the first message sent by the second electronic device. The first message is the first data required by the first electronic device, and the first electronic device feeds received first message to the application layer, so as to acquire the data required by the first electronic device, such that the application layer may perform an analysis and processing based on the first data.

At block S103, the method includes requesting the application layer to output the processing result about the first transaction based on the first message, in a case where the set bit indicates that the first transaction is the passive transaction.

Herein, in the case where the set bit indicates that the first transaction is the passive transaction, it is indicated that the first message received by the first electronic device is obtained based on the transaction initiated by the second electronic device. The first electronic device requests the application layer to output the processing result about the first transaction based on the first message. The processing result about the first transaction output by the application layer is data configured to respond to the transaction initiated by the second electronic device. In an embodiment, when required to acquire second data in the first electronic device, the second electronic device initiates a transaction to acquire the second data in the first electronic device. After receiving the first message sent by the second electronic device, the first electronic device requests the application layer to output the second data based on the first message, such that the first electronic device may acquire the data required by the second electronic device.

In the above embodiments, the first electronic device receives the first message sent by the second electronic device, the first message carries the first identifier, and the first identifier is configured to mark the first transaction to which the first message belongs. The set bit in the first identifier is configured to indicate whether the first transaction is the active transaction or the passive transaction, the active transaction indicates the transaction initiated by the first electronic device, and the passive transaction indicates the transaction initiated by the second electronic device. In the case where the set bit indicates that the first transaction is the active transaction, the processing result about the first transaction in the first message is fed back to the application layer. In the case where the set bit indicates that the first transaction is the passive transaction, the application layer is requested to output the processing result about the first transaction based on the first message. In this way, the electronic device may track a property of the transaction and identify the active transaction and the passive transaction based on the first identifier, and thus accurately respond to the different transactions. Thus, the efficiency of the data exchange may be improved.

In an embodiment, the method further includes sending a second message about the first transaction to the second electronic device. The second message carries the first identifier.

Herein, the first electronic device sends the second message about the first transaction to the second electronic device, and the second message carries the first identifier. A property of a transaction corresponding to a second message may be determined based on the first identifier. When the first identifier indicates that the first transaction is the active transaction, it indicates that the data is required to be sent to the second electronic device, such that the second electronic device performs processing based on received data, so as to obtain the processing result of the first transaction. The second message may be a data exchange in a process of completing the first transaction, the first identifier carried by the second message may allow the second electronic device to identify that the received second message is to-be-processed data. In this way, the transaction to which the second message received by the second electronic device belongs may be determined based on the first identifier, while the second electronic device tracks the property of the transaction based on the first identifier, which may ensure the data exchange in a process of processing one transaction. When the first identifier indicates that the first transaction is the passive transaction, it indicates that the second electronic device is required to send the data to the first electronic device, and the first electronic device returns the second message after the first electronic device processes the data. The second message is the processing result of the first transaction and carries the first identifier. When receiving the second message carrying the first identifier, the second electronic device may determine currently-received information is the data required to be acquired by the second electronic device, instead of mistaking the received second data as the to-be-processed data in the transaction. In addition, the second electronic device may also determine the transaction to which the second message received by the second electronic device belongs according to the first identifier, so as to complete processing the transaction based on the data of a same transaction, which improves an efficiency of processing the transaction. In the practical application, when the first transaction requires a longer processing duration, a processing end of the transaction may report a processing progress of the transaction to a requesting end of the transaction by means of the alerting message. In an embodiment, when the second electronic device initiates the first transaction and the first electronic device processes the first transaction initiated by the second electronic device, the first electronic device returns the alerting message to the second electronic device during processing the first transaction to inform the second electronic device of the processing progress of the first transaction. In the practical application, an operation flow is between a start time point of the transaction and an end time point of the transaction, and a duration of the operation flow may be set less than or equal to 500 ms. When the transaction is not completed being processed within 200 ms after the processing end of the transaction starts to process the transaction, it is indicated that the duration for processing the transaction is long, and the alerting message is required to be sent to the requesting end of the transaction. In the practical application, when receiving the alerting message, the requesting end of the transaction may not process the alerting message.

In the above embodiment, the second message of the first transaction is sent to the second electronic device. The second message carries the first identifier, such that uniformity of the data exchange during processing the same transaction may be ensured by means of the first identifier, and thus the data of the same transaction may be processed correspondingly. In this way, both an efficiency of exchanges among data and the efficiency of processing the transaction are improved.

Figure 2:
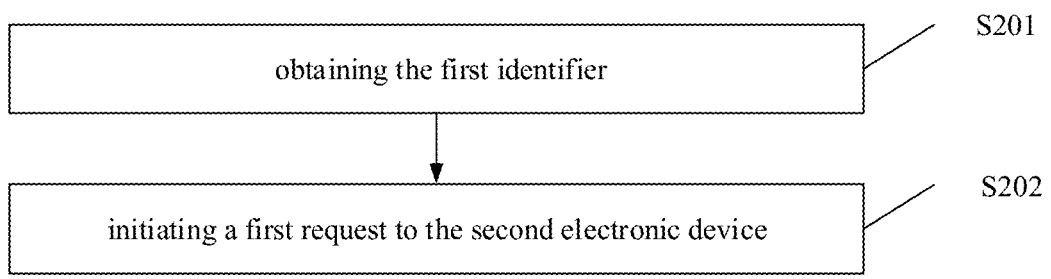
FIG. 2 is a schematic implementing flowchart of the data exchange method according to another embodiment of the present disclosure.

In an embodiment, as shown in FIG. 2, in the case where the set bit indicates that the first transaction is the active transaction, the method further includes operations at the following blocks.

At block S201, the method includes obtaining the first identifier.

Herein, the first identifier is acquired in the case where the set bit indicates that the first transaction is the active transaction. The first identifier is configured to mark the first transaction. In the practical application, the first identifiers corresponding to different transactions are different from each other, such that a corresponding transaction may be determined based on the first identifier.

At block S202, the method includes initiating a first request to the second electronic device, the first request is configured to initiate the first transaction to the second electronic device, and the first request carries the first identifier.

Figure 3:
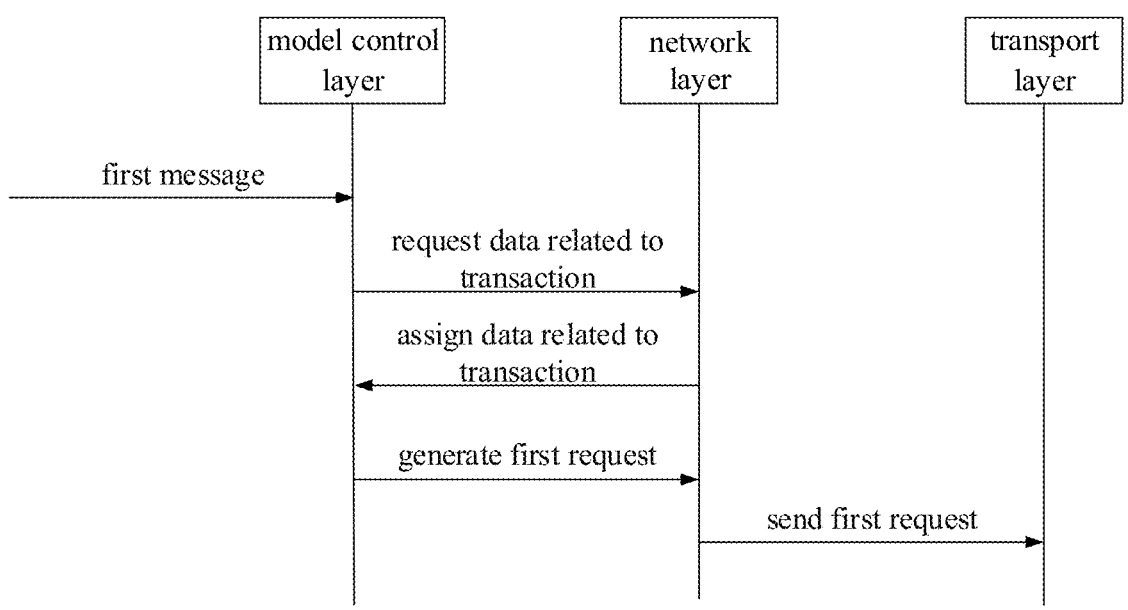
FIG. 3 is a schematic flowchart of processing an active transaction according to an embodiment of the present disclosure.
Figure 4:
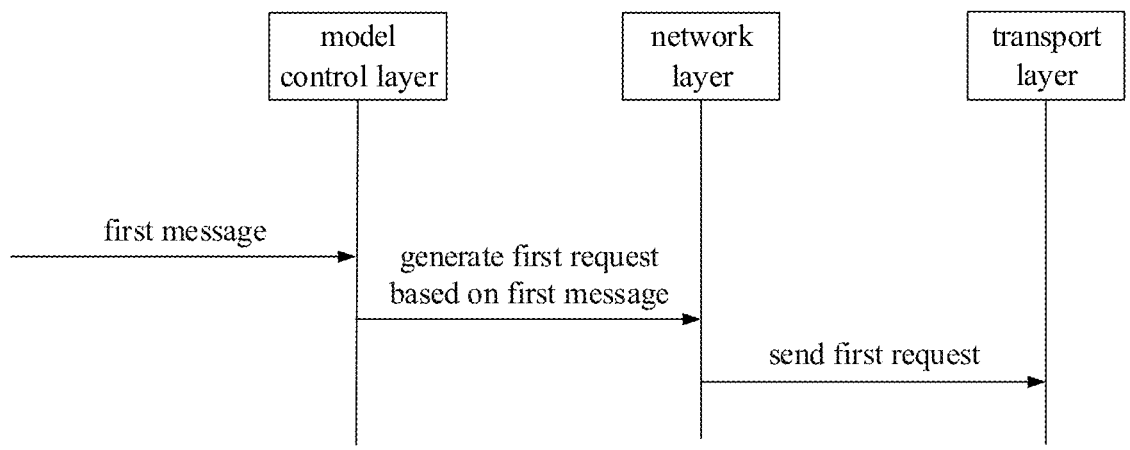
FIG. 4 is a schematic flowchart of processing a same active transaction according to an embodiment of the present disclosure.

Herein, the first request is initiated or issued to the second electronic device, the first request is configured to initiate the first transaction to the second device, and the first request carries the first identifier, such that the second electronic device may process the first transaction corresponding to the first identifier according to the first identifier. In the practical application, the second electronic device may be required to process multiple transactions, and accordingly required to perform multiple times of data exchanges. Data corresponding to the different transactions may be distinguished based on the first identifiers during processing the different transactions, which improves a speed of the data exchange and also reduces a possibility of damaging an effect of processing the transaction which is caused by mistaking processing results of other transactions as the processing result of the first transaction. As shown in FIG. 3, FIG. 3 is a schematic flowchart of processing an active transaction according to an embodiment of the present disclosure. A model control layer receives the first message sent by the second electronic device, and acquires association data of the first transaction from a network layer based on the first message. The network layer returns the association data of the first transaction to the model control layer. The model control layer generates the first request based on the association data of the first transaction and the first message, and initiates the first request to the second electronic device after the first request is packaged by the network layer and subsequently encrypted by a security transport layer. FIG. 4 is a schematic flowchart of processing a same active transaction according to an embodiment of the present disclosure. In the practical application, when the first electronic device and the second electronic device process the same first transaction, as shown in FIG. 4, the first device may generate the first request and initiate the first request to the second electronic device.

In the above embodiment, in the case where the set bit indicates that the first transaction is the active transaction, the first identifier is acquired, and the first request is initiated to the second electronic device. The first request is configured to initiate the first transaction to the second electronic device and carries the first identifier, such that the processing for the active transaction is completed according to the first identifier, which improves the efficiency of the data exchange.

In an embodiment, the method further includes deleting the first identifier after the first transaction ends.

Herein, after the first transaction ends, the first identifier of the first transaction may be deleted. The first electronic device deleting the first identifier corresponding to the first transaction indicates that the first transaction has been completed and no further processing for the first transaction is required. In the practical application, the first identifier may be deleted from the network layer, such that a possibility of the same transaction being processed multiple times may be reduced.

In the above embodiment, after the first transaction ends, the first identifier is deleted, such that the transaction may be identified to be in an ending status by means of deleting the identifier. In this way, the possibility of the same transaction being processed multiple times may be reduced, and the efficiency of processing the transaction may be improved.

In an embodiment, in the case where the set bit indicates that the first transaction is the passive transaction, the method further includes receiving a second request of the second electronic device. The second request is configured to initiate the first transaction to the first electronic device, and the second request carries the first identifier.

Herein, in the case where the set bit indicates that the first transaction is the passive transaction, it is indicated that the first electronic device is a processing performer of the first transaction. The first electronic device receives the second request of the second electronic device, and the second request is configured to initiate the first transaction to the first electronic device for the second electronic device. The first electronic device processes the first transaction according to the second request received by the first electronic device, and the second request carries the first identifier, such that the first electronic device may distinguish the first transaction from other to-be-processed transactions by means of the first identifier.

In the above embodiment, in the case where the set bit indicates that the first transaction is the passive transaction, the second request of the second electronic device is received, the second request is configured to initiate the first transaction to the first electronic device, and the second request carries the first identifier, such that the electronic device may process the transaction according to the first identifier and the efficiency of the data exchange is improved.

Figure 5:
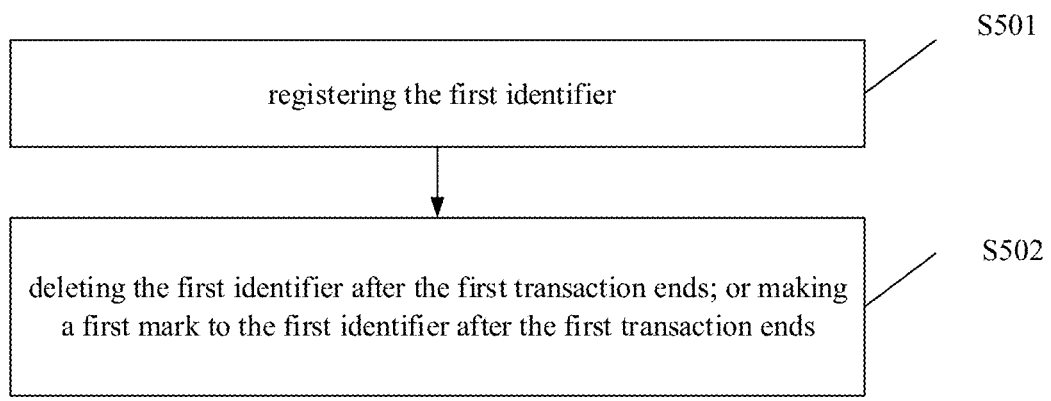
FIG. 5 is a schematic implementing flowchart of the data exchange method according to an embodiment of present disclosure.

In an embodiment, as shown in FIG. 5, the method further includes operations at blocks S501-S502.

At block S501, the method includes registering the first identifier.

Herein, when receiving the second request of the second electronic device, the first electronic device registers the first identifier. First identifier information may be registered in the network layer of the first electronic device. After the first identifier is registered, the first electronic device may process the transaction based on registered first identifier. In an embodiment, the first electronic device may determine identifier information corresponding to data sent to the second electronic device based on the registered first identifier, so as to ensure the data is exchanged within the same transaction.

At block S502, the method includes deleting the first identifier after the first transaction ends; or making a first mark to the first identifier after the first transaction ends. The first mark indicates that the first transaction ends.

Herein, after the first transaction ends, the first identifier is deleted. For example, the first identifier information registered in the network layer by the first electronic device is deleted, which indicates that the transaction corresponding to the first identifier is not required to be processed. After the first transaction ends, the first mark may be made to the first identifier, and the first mark indicates that the first transaction ends. When the first identifier with the first mark is stored in the first electronic device, it is indicated that the first electronic device has finished processing a corresponding transaction. In the practical application, the first mark may be made to the first identifier and the first identifier is deleted after the first transaction ends.

In the above embodiment, the first identifier is registered, and is deleted after the first transaction ends. Alternatively, the first mark may be made to the first identifier after the first transaction ends. The first mark indicates that the first transaction ends. In this way, a processing status of the transaction may be determined by means of deleting or marking the identifier, the possibility of the same transaction being processed multiple times may be reduced, and the efficiency of processing the transaction may be improved.

In an embodiment, the method further includes returning a response error code about the first transaction to the second electronic device in response to detecting the first mark in a case where the second request is required.

Herein, in the case where the second request is received, when the first identifier carried in the second request has the first mark, it may be detected that the first mark exists in the second request. The first electronic device returns the response error code to the second electronic device about the first transaction. The first mark is configured to indicate that the transaction has ended, and indicates that a current transaction has been completed. When a processing request for an ended transaction is received, it is indicated that an error occurs to a transaction request, and the response error code about the first transaction is returned to the second electronic device, such that the second electronic device may be informed to determine whether the error occurs in a currently-initiated transaction. In the practical application, when no first mark is detected in a received second request, it is indicated the transaction of the second request does not end, and the first electronic device may continue processing the transaction according to the second request.

In the above embodiment, in the case where the second request is received, when the first mark is detected, the response error code about the first transaction is returned to the second electronic device, such that the processing status of the transaction may be determined based on the mark, the possibility of the same transaction being processed multiple times may be reduced, and the efficiency of processing the transaction may be improved.

In an embodiment, the set bit is the highest bit of the first mark.

Herein, the first identifier includes a plurality of bits, and the highest bit may be taken as the set bit configured to indicate whether the first transaction is the active transaction or the passive transaction. For example, a value of the highest bit in the first identifier corresponding to the first transaction sent by the first electronic device is 1, and for the first electronic device, the current first transaction is the active transaction. A value of the highest bit in the first identifier corresponding to the first transaction sent by the second electronic device is 0, and for the first electronic device, the current first transaction is the passive transaction.

In the above embodiment, the set bit is the highest bit of the first identifier. In this way, the processing performer of the transaction may be determined by means of the first identifier, and a corresponding process may be performed for the transaction based on the first identifier, such that the efficiency of processing the transaction may be improved.

Figure 6:
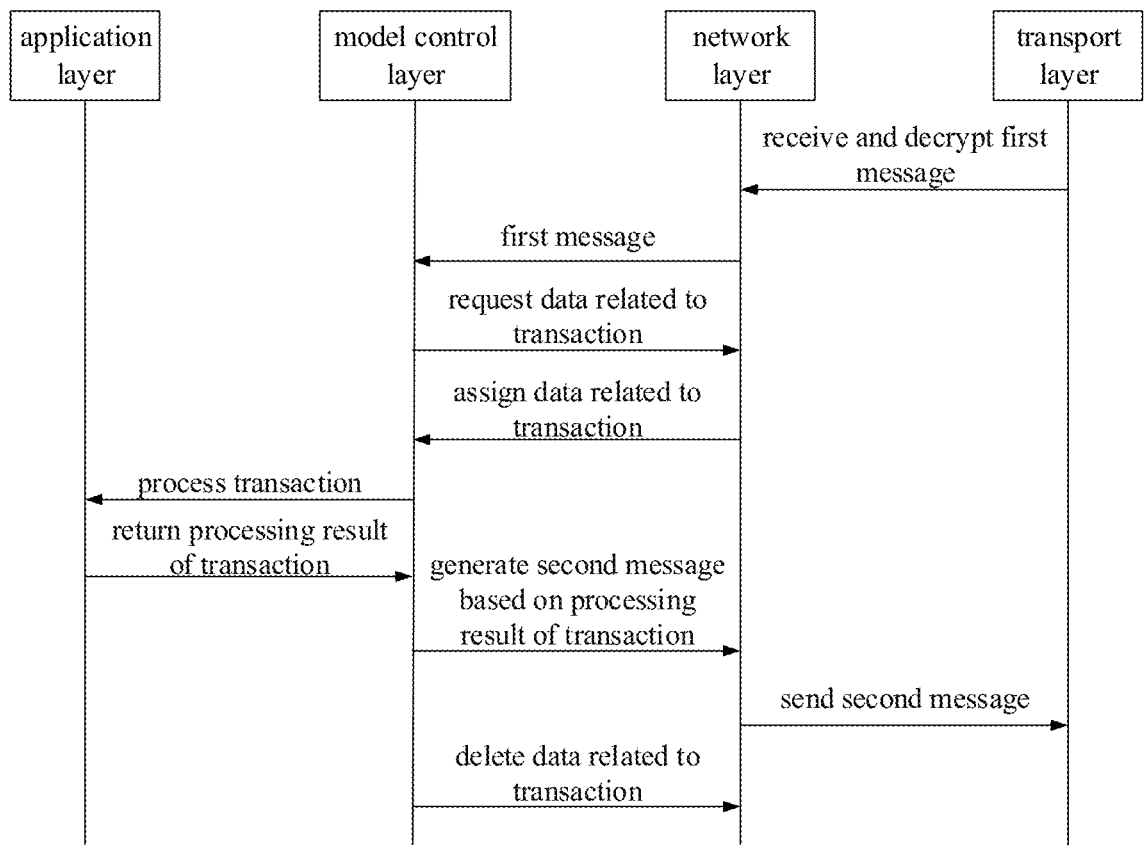
FIG. 6 is a schematic flowchart of performing asynchronous processes for different transactions according to an application embodiment of present disclosure.

Some embodiments of the present disclosure also provide an application embodiment, as shown in FIG. 6, and FIG. 6 is a schematic flowchart of performing asynchronous processes for different transactions according to an application embodiment of present disclosure. The asynchronous processes are performed for the different transactions, which indicates that other transactions may be processed while the first transaction is in an un-ended state. In an embodiment, the second electronic device may continue processing other transactions after initiating the first transaction to the first electronic device. The first electronic device performs a decrypting process based on the received first message and determines the association data of the first transaction based on the first identifier corresponding to the first message, so as to process the associated data of the first transaction through the application layer, and output the processing result about the first transaction obtained after the associated data of the first transaction is processed, to complete processing the passive transaction. In the practical application, the transaction between an electronic device and another electronic device, and the transaction between an electronic device and a server may be processed. For example, the transaction between the electronic device and another electronic device under the Internet of Things and the transaction between the electronic device and the server under the Internet of Things may be processed. In the practical application, when the asynchronous processes are performed for multiple transactions, a request and a corresponding response may be accurately and quickly made according to the first identifier corresponding to the data during the processing of the transaction, such that the efficiency of the data exchange and the effect of processing the transaction may be improved.

Figure 7:
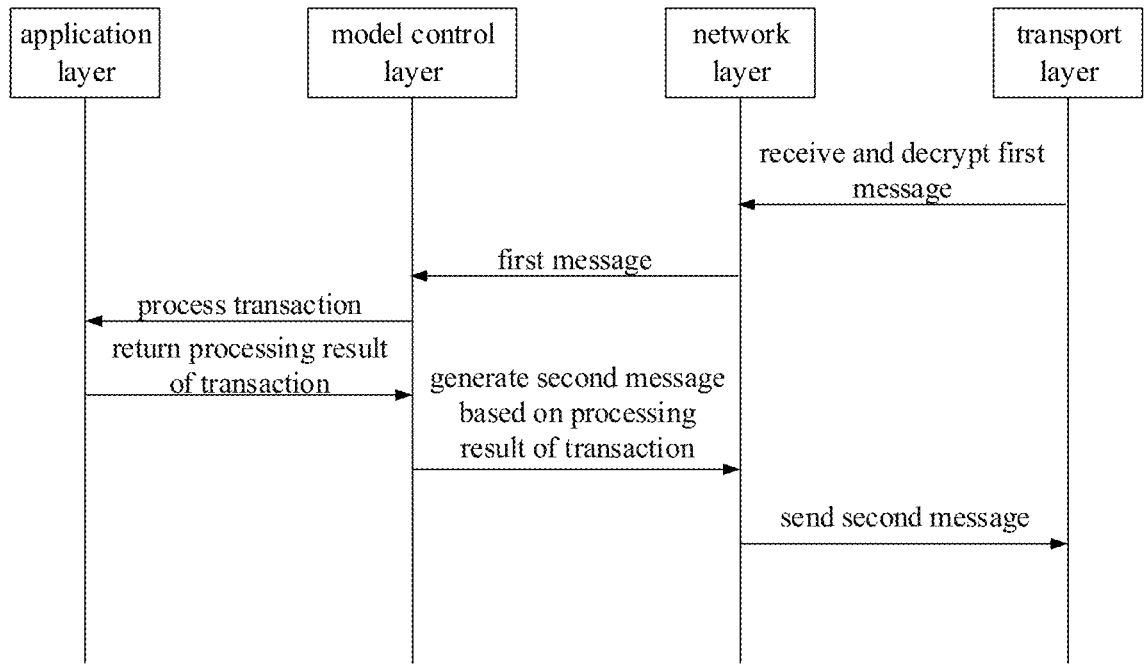
FIG. 7 is a schematic flowchart of performing synchronous processes for different transactions according to an application embodiment of present disclosure.

Some embodiments of the present disclosure also provide another application embodiment, and synchronous processes for the different transactions may be compatible in this embodiment. As shown in FIG. 7, FIG. 7 is a schematic flowchart of performing the synchronous processes for different transactions according to an application embodiment of present disclosure. The synchronous processes are performed for the different transactions, which indicates that other transactions are processed only when the first transaction is in an ended status. For example, the second electronic device initiates the first transaction to the first electronic device, it is required that the second electronic device can continue completing transaction processing only after the first electronic device returns the processing result of the first transaction to the second electronic device. Therefore, both the first electronic device and the second electronic device process the same transaction, and all data exchanges between the first electronic device and the second electronic device belong to the same transaction, such that the first identifier may be not required or carried in data exchanging processes. A business layer may directly process the data according to the first message and output the processing result about the first transaction after the first electronic device receives the first message. In the practical application, both the transaction between the electronic device and another electronic device and the transaction between the electronic device and the server can be processed. In an embodiment, both the transaction between the electronic device and another electronic device under the Internet of Things and the transaction between the electronic device and the server under the Internet of Things can be processed.

Figure 8:
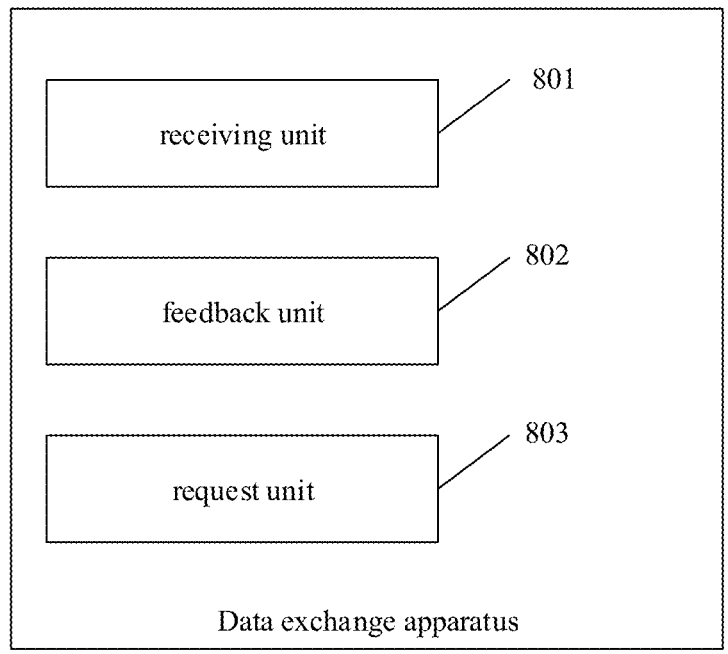
FIG. 8 is a structural schematic view of a data exchange apparatus according to an embodiment of present disclosure.

To implement the method in the embodiments of the present disclosure, the present disclosure embodiment also provides a data exchange apparatus, as shown in FIG. 8. The apparatus includes a receiving unit 801, a feedback unit 802, and a request unit 803.

The receiving unit 801 is configured to receive a first message sent by a second electronic device. The first message carries a first identifier, and the first identifier is configured to mark a first transaction to which the first message belongs. A set bit in the first identifier is configured to indicate whether the first transaction is an active transaction or a passive transaction, the active transaction indicates a transaction initiated by the first electronic device, and the passive transaction indicates a transaction initiated by the second electronic transaction.

The feedback unit 802 is configured to feed a processing result about the first transaction in the first message back to an application layer, in a case where the set bit indicates that the first transaction is the active transaction.

The request unit 803 is configured to request the application layer to output the processing result about the first transaction based on the first message, in a case where the set bit indicates that the first transaction is the passive transaction.

In an embodiment, the apparatus is further configured to send a second message about the first transaction to the second electronic device, and the second message carries the first identifier.

In an embodiment, in the case where the set bit indicates that the first transaction is the active transaction, the apparatus is further configured to obtain the first identifier and initiate a first request to the second electronic device. The first request is configured to initiate the first transaction to the second electronic device, and the first request carries the first identifier.

In an embodiment, the apparatus is further configured to delete the first identifier after the first transaction ends.

In an embodiment, in the case where the set bit indicates that the first transaction is the passive transaction, the apparatus is further configured to receive a second request of the second electronic device. The second request is configured to initiate the first transaction to the first electronic device, and the second request carries the first identifier.

In an embodiment, the apparatus is further configured to register the first identifier; delete the first identifier after the first transaction ends; or make a first mark to the first identifier after the first transaction ends. The first mark indicates the first transaction ends.

In an embodiment, in a case where the second request is required, the apparatus is further configured to return a response error code about the first transaction to the second electronic device in response to detecting the first mark.

In an embodiment, the set bit is the highest bit of the first identifier.

In the practical application, the receiving unit 801, the feedback unit 802, and the request unit 803 may be implemented by a processor in the data exchange apparatus. Of course, the processor is required to run programs stored in a memory to implement functions of each program module or unit described above.

It should be noted that when the data exchange apparatus provided in the above embodiment of FIG. 8 performs data exchanging, a division of each program module described above is taken as an example to be illustrated. In the practical application, the above processes may be assigned to and executed by different program modules according to requirements. That is, an internal structure of the apparatus is divided into the different program modules to complete all or part of the above described processes. In addition, the data exchange apparatus provided in the above embodiments belongs to a same concept as the embodiments about the data exchange method, a specific implementation process of which may refer to the method embodiments and is not repeated.

Figure 9:
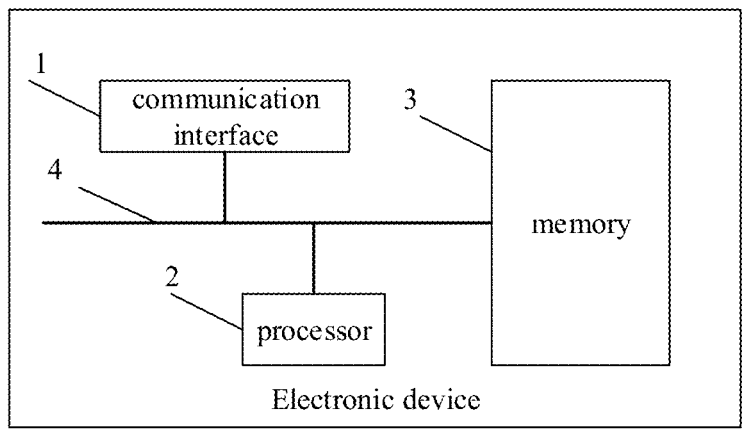
FIG. 9 is a structural schematic view of a hardware composition of an electronic device according to an embodiment of the present disclosure.

Based on a hardware implementation of the above program modules, and in order to implement the method in the embodiments of the present disclosure, an electronic device is provided in the embodiments of the present disclosure. FIG. 9 is a structural schematic view of a hardware composition of the electronic device according to this embodiment of the present disclosure. As shown in FIG. 9, the electronic device includes a communication interface 1 and a processor 2.

The communication interface 1 is capable of exchanging information with other devices such as network devices, etc.

The processor 2 is connected to the communication interface 1 to exchange the information with the other devices, and is configured to implement the data exchange method provided in one or more technical solutions described above when running a computer program. The computer program is stored in the memory 3.

Of course, in the practical application, various components in the electronic device are coupled together via a bus system 4. It can be understood that the bus system 4 is configured to implement connection communication among these components. In addition to the data bus, the bus system 4 also includes a power bus, a control bus, and a status signal bus. For clear descriptions, various buses are all shown as the bus system 4 in FIG. 9

In this embodiment, the memory 3 is configured to store various types of data to support the operations of the electronic device. Examples of these data include any computer program configured to be operated on the electronic device.

Understandably, the memory 3 may be a volatile memory or a non-volatile memory, or include both the volatile memory and the non-volatile memory. The non-volatile memory may be a Read Only Memory (ROM), a Programmable Read-Only Memory (PROM), an Erasable Programmable Read-Only Memory (EPROM), an Electrically EPROM (EEPROM), a Ferromagnetic Random Access Memory (FRAM), a Flash Memory, a magnetic surface memory, a CD (Compact Disc), or a CD-ROM (Compact Disc Read-Only Memory). The magnetic surface memory may be a disk memory or a magnetic tape memory. The volatile memory may be a Random Access Memory (RAM), which is configured as an external cache. By means of an exemplary but not limitative illustrations, many forms of RAM are available, such as a Static Random Access Memory (SRAM), a Synchronous Static Random Access Memory (SSRAM), a Dynamic Random Access DRAM (DRAM), a SDRAM (Synchronous Dynamic Random Access Memory), a DDRSDRAM (Double Data Rate Synchronous Dynamic Random Access Memory (DDRS-DRAM), an Enhanced Synchronous Dynamic Random Access Memory (ESDRAM), a Synchronous Link Dynamic Random Access Memory (SLDRAM), and a Direct Memory Bus Random Access Memory (DRRAM). The memory 3 described in the embodiments of the present disclosure is intended to include these memories and any other suitable types of memories, but not limited thereto.

The method disclosed in the above embodiments of the present disclosure may be applied in or implemented by the processor 2. The processor 2 may be an integrated circuit chip and has a capability of processing a signal. In an implementation process, each operation of the method described above may be completed by means of an integrated logic circuit in form of hardware or by instructions in form of software in the processor 2. The processor 2 described above may be a general purpose processor, a DSP, or other programmable logic device, a discrete gate or a transistor logic device, or a discrete hardware component, etc. The processor 2 may implement or perform each method, operation, and logical block diagram described in the embodiments of the present disclosure. The general purpose processor may be a microprocessor or any conventional processor, etc. The operations of the method described in combination with the embodiments of the present disclosure may be embodied to be executed and completed directly by a hardware decoding processor or by a combination of a hardware module and a software module in a decoding processor. The software module may be located in a storage medium, and the storage medium is located in the memory 3. The processor 2 reads the program in the memory 3 and completes the operations of the method described above in combination with the hardware of the processor 2.

The processor 2 implement a corresponding operation of each method in the embodiments of the present disclosure when executing the program, which is not repeated for concise description.

In some embodiments, the present disclosure embodiment also provides a storage medium, i.e., a computer storage medium, specifically a computer-readable storage medium. For example, the storage medium includes the memory 3 storing the computer program, and the computer program is executable by the processor 2. When the processor 2 executes the computer program, the operations of the method described above may be completed. The computer-readable storage medium may be a memory such as a FRAM, ROM, PROM, EPROM, EEPROM, Flash Memory, magnetic surface memory, CD, or CD-ROM, etc.

In several embodiments in the present disclosure, it should be understood that the apparatus, the terminal, and the method described therein, may be implemented in other ways. The embodiments of the device described above are only schematic. For example, the division of the units described is only a logical functional division, other division manners may be allowed in practical implementation. For example, multiple units or components may be combined, or may be integrated into another system. Alternatively, some features may be ignored, or not implemented. In addition, the components shown or discussed may be coupled to, or directly coupled to, or in communication connection with each other by means of some interfaces. Indirect coupling or communication connection between devices or units may be electrical or mechanical, or in other manners.

The units illustrated above as separate components may or may not be physically separated from each other. The components shown as the units may or may not be physical units, i.e., the components may be located in a place or distributed in a plurality of network units. Some or all of units may be selected according to practical needs to achieve the purpose of the solution of the embodiments of the present disclosure.

In addition, various functional units in each embodiment of the present disclosure may all be integrated in a single processing unit, or each unit may be a single unit, respectively, or two or more units may be integrated in a single unit. The above integrated unit may be implemented either in form of the hardware or in form of a combination of the hardware and a software functional unit.

One of ordinary skill in the art may understand that all or a part of the operations of the method in the embodiments of the present disclosure described above may be implemented by the hardware related to program instructions. The foregoing program may be stored in the computer-readable storage medium. When the program is executed, the operations including the above embodiments of the method are executed. The foregoing storage medium includes the medium capable of storing program codes, such as a mobile storage device, ROM, RAM, diskette, or CD, etc.

Alternatively, when implemented in form of a software function module, and sold or used as an independent product, the integrated unit described above in the present disclosure may be stored in a computer-readable storage medium. On basis of this understanding, a portion of the technical solution of the embodiments of the present disclosure, which is essential or which contributes to the related art may be embodied in form of a software product. The computer software product is stored in the storage medium and includes a number of instructions configured to enable an electronic device (e.g., a personal computer, a server, or a network device, etc.) to perform all or part of the method described in the embodiments of the present disclosure. The foregoing storage medium includes the medium capable of storing the program codes, such as the mobile storage device, ROM, RAM, diskette, or CD, etc.

It should be noted that terms "first", "second", etc. are configured to distinguish similar objects and not required to describe a particular order or a sequence.

Additionally, technical solutions recited in the embodiments of the present disclosure may be combined arbitrarily in a case without conflict.

The descriptions above are simply some specific embodiments of the present disclosure, and the scope of the present disclosure is not limited thereto. Any variation or substitution readily comes to the mind of one of ordinary skill in the art within the technical scope of the present disclosure, may fall into the scope of the present disclosure. The scope of the present disclosure should be subjected to the scope of the claims.

What is claimed is:

1. A data exchange method, applied to a first electronic device, the method comprising:
   receiving a first message sent by a second electronic device, wherein the first message carries a first identifier, the first identifier is configured to mark a first transaction to which the first message belongs, a set bit in the first identifier is configured to indicate whether the first transaction is an active transaction or a passive transaction; the active transaction indicates a transaction initiated by the first electronic device, and the passive transaction indicates a transaction initiated by the second electronic device;
   feeding a processing result about the first transaction in the first message back to an application layer, in a case where the set bit indicates that the first transaction is the active transaction; and
   requesting the application layer to output the processing result about the first transaction based on the first message, in a case where the set bit indicates that the first transaction is the passive transaction.

2. The method as claimed in claim 1, further comprising:
   sending a second message about the first transaction to the second electronic device; wherein the second message carries the first identifier.

3. The method as claimed in claim 1, wherein in the case where the set bit indicates that the first transaction is the active transaction, the method further comprises:
   obtaining the first identifier; and
   initiating a first request to the second electronic device, wherein the first request is configured to initiate the first transaction to the second electronic device, and the first request carries the first identifier.

4. The method as claimed in claim 3, further comprising:
   deleting the first identifier after the first transaction ends.

5. The method as claimed in claim 1, wherein in the case where the set bit indicates that the first transaction is the passive transaction, the method further comprises:
   receiving a second request of the second electronic device, wherein the second request is configured to initiate the first transaction to the first electronic device, and the second request carries the first identifier.

6. The method as claimed in claim 5, further comprising:
   registering the first identifier;
   deleting the first identifier after the first transaction ends; or
   making a first mark to the first identifier after the first transaction ends, wherein the first mark indicates the first transaction ends.

7. The method as claimed in claim 6, further comprising:
   in a case where the second request is required, returning a response error code about the first transaction to the second electronic device in response to detecting the first mark.

8. The method as claimed in claim 1, wherein the set bit is a highest bit of the first identifier.

9. The method as claimed in claim 1, wherein the method is implemented in a case where the first electronic device processes at least two transactions simultaneously.

10. An electronic device, comprising:
    a processor; and
    a memory, configured to store a computer program runnable on the processor;
    wherein when running the computer program, the processor is configured to perform:
       receiving a first message sent by a second electronic device, wherein the first message carries a first identifier, the first identifier is configured to mark a first transaction to which the first message belongs, a set bit in the first identifier is configured to indicate whether the first transaction is an active transaction or a passive transaction; the active transaction indicates a transaction initiated by the electronic device, and the passive transaction indicates a transaction initiated by the second electronic device;
       feeding a processing result about the first transaction in the first message back to an application layer, in a case where the set bit indicates that the first transaction is the active transaction; and
       requesting the application layer to output the processing result about the first transaction based on the first message, in a case where the set bit indicates that the first transaction is the passive transaction.

11. The electronic device as claimed in claim 10, wherein the processor is further configured to perform:
    sending a second message about the first transaction to the second electronic device; wherein the second message carries the first identifier.

12. The electronic device as claimed in claim 11, wherein the processor is further configured to perform:
    obtaining the first identifier; and
    initiating a first request to the second electronic device, wherein the first request is configured to initiate the first transaction to the second electronic device, and the first request carries the first identifier.

13. The electronic device as claimed in claim 10, wherein in the case where the set bit indicates that the first transaction is the passive transaction, the processor is further configured to perform:
    receiving a second request of the second electronic device, wherein the second request is configured to initiate the first transaction to the electronic device, and the second request carries the first identifier.

14. The electronic device as claimed in claim 13, wherein the processor is further configured to perform:
    registering the first identifier;
    deleting the first identifier after the first transaction ends; or
    making a first mark to the first identifier after the first transaction ends, wherein the first mark indicates the first transaction ends.

15. The electronic device as claimed in claim 10, wherein the set bit is a highest bit of the first identifier.

16. A non-transitory storage medium, storing a computer program, wherein when the computer program is executed by a processor, the processor is configured to implement:
    receiving, by a first electronic device, a first message sent by a second electronic device, wherein the first message carries a first identifier, the first identifier is configured to mark a first transaction to which the first message belongs, a set bit in the first identifier is configured to indicate whether the first transaction is an active transaction or a passive transaction; the active transaction indicates a transaction initiated by the first electronic device, and the passive transaction indicates a transaction initiated by the second electronic device;

feeding a processing result about the first transaction in the first message back to an application layer, in a case where the set bit indicates that the first transaction is the active transaction; and requesting the application layer to output the processing result about the first transaction based on the first message, in a case where the set bit indicates that the first transaction is the passive transaction.

17. The non-transitory storage medium as claimed in claim 16, wherein the processor is further configured to implement:

sending a second message about the first transaction to the second electronic device; wherein the second message carries the first identifier.

18. The non-transitory storage medium as claimed in claim 16, wherein the processor is further configured to implement:

obtaining the first identifier; and initiating a first request to the second electronic device, wherein the first request is configured to initiate the first transaction to the second electronic device, and the first request carries the first identifier.

19. The non-transitory storage medium as claimed in claim 16, wherein the processor is further configured to implement:

receiving a second request of the second electronic device, wherein the second request is configured to initiate the first transaction to the first electronic device, and the second request carries the first identifier.

20. The non-transitory storage medium as claimed in claim 16, wherein the set bit is a highest bit of the first identifier.

* * * * *